Jan. 30, 1934.   H. S. LOOMIS   1,945,283

RESILIENT TIRE CONSTRUCTION FOR TRACK CIRCUIT SHUNTING

Filed June 24, 1932

INVENTOR
Harold S. Loomis
BY
HIS ATTORNEY

Patented Jan. 30, 1934

1,945,283

UNITED STATES PATENT OFFICE 1,945,283

RESILIENT TIRE CONSTRUCTION FOR TRACK CIRCUIT SHUNTING

Harold S. Loomis, Wilkinsburg, Pa., assignor to The Union Switch & Signal Company, Swissvale, Pa., a corporation of Pennsylvania Application June 24, 1932. Serial No. 619,077

2 Claims. (Cl. 246—34)

My invention relates to resilient tire construction for track circuit shunting, and more specifically to the construction of pneumatic tires or other tires for use on railway vehicles, said tires having a flexible conducting tread which deforms readily due to the weight of the vehicle, producing a relatively large rail contact area for traction and track shunting, as compared with the small rail contact area obtainable with the usual steel tread wheel.

I will describe one form of tire construction embodying my invention, and will then point out the novel features thereof in claims.

Figure 1:
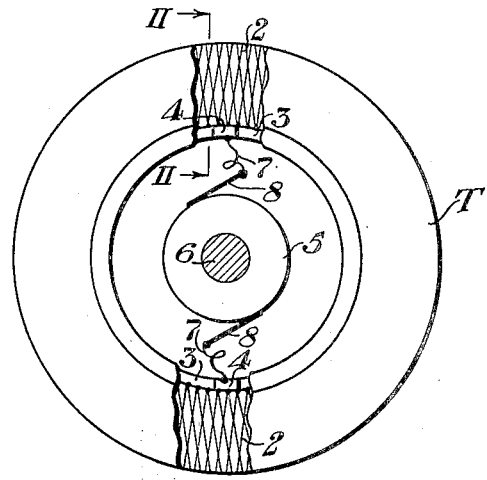
Figure 2:
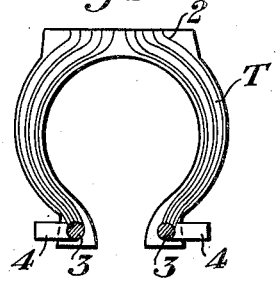
Figure 3:
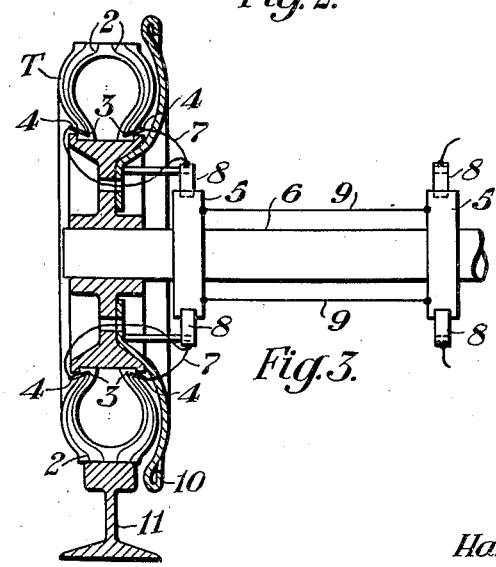

In the accompanaying drawing, Fig. 1 is a side view of one form of a tire shoe embodying my invention, which for purposes of illustration is of the usual pneumatic type, with the outer layers of rubber and fabric partly removed to show the interior construction, but it will be understood that the advantages of my invention can be obtained with any tire having a resilient tread containing or constructed of flexible conducting material, which tread is capable of being readily deformed due to the weight of the car. Fig. 2 is an enlarged sectional view of the tire shoe on line II—II of Fig. 1, showing additional details of construction. Fig. 3 shows an assembly of the tire shoe upon a wheel and axle of a rail vehicle, with the auxiliary apparatus which I provide for obtaining track circuit shunting.

Similar reference characters refer to similar parts in each of the three figures.

It is well known that pneumatic tires when used on light weight rail vehicles such as the gas-electric car for example, offer certain advantages from the standpoint of noise and road shock elimination and the provision of greater tractive characteristics for the transmission of motive power and for braking. However, the use of pneumatic tires of the ordinary type presents a serious problem with regard to track circuit shunting. One object of my invention is to provide a tire of such construction as to provide satisfactory shunting of the track in a manner both simple and dependable.

Referring to Fig. 1 of the drawing, the tire shoe T has a closed ring 3 of flexibly interwoven conducting wires embedded within each rim or bead of the shoe. Connected electrically with each ring 3 are numerous conducting wires 2 embedded within the walls and ending in the tread or traction surface of the shoe. The wires 2 may be arranged in several layers in crisscross manner throughout the walls of the shoe, although the particular arrangement of wires 2 is not important, the only requirement being that these wires make contact with their respective ring 3, and extend so as to perforate the tread surface throughout the complete circumference of the tread, and that a sufficient number of wires is used to occupy the major portion of the tread surface. Each ring 3 is connected electrically with a drum 5 on the axle housing by means of a brush 8 and a connector 7 fastened to the ring 3 through the medium of a lug 4.

Referring to Fig. 3 of the drawing, each of the drums 5 of a wheel pair are connected together electrically by conductors 9, and it will be apparent that there is provided thereby a closed shunt path from one rail 11 of the track, to the remaining rail, which path includes the wires 2 in contact with the rail surface, rings 3, connectors 7, brushes 8, drum 5, and connectors 9, and similarly through the respective elements of the remaining wheel of the pair.

Instead of the individual wires 2, layers of a conducting wire mesh, the wires of which perforate the tire tread, can be used, to produce a low resistance contact with the rail surface. The drum 5, being fixed to the axle housing, does not rotate with the wheel and axle assembly. The brushes 8 are suitably fastened to the wheel structure for rotation therewith.

It will be understood that the shoe T will in practice contain the usual "inner tube", which tube is not shown in the accompanying drawing because it forms no part of my invention.

One advantage of a tire construction embodying my invention is that when a steel wheel of the ordinary type is used, it is difficult to obtain more than a point or a line contact with the rail, whereas a tire having conducting material embedded in the tread, or made of resilient material having electrical conductivity provides a large area of contact with the rail, materially decreasing the contact resistance and so improving track shunting, particularly in the case of light weight rail vehicles.

It will be understood that to accomplish the object of my invention various methods of rendering the tire tread electrically conducting can be used, other than the embedded wire method described above, provided a low resistance contact from rail to rail is established through the medium of the conducting material forming an integral part of the tread.

Although I have herein shown and described only one form of tire construction for track circuit shunting embodying my invention, it is understood that various changes and modifications may be made therein within the scope of the appended claims without departing from the spirit and scope of my invention.

Having thus described my invention, what I claim is:

1. In combination with a rail vehicle and a stretch of railway track, a pair of resilient tires for a wheel pair mounted upon an axle of said vehicle, a first conductor embedded within each of said tires, a group of secondary conductors for each tire connected with said first conductor of the respective tire and extending into the tire tread in such manner as to perforate the tread surface, and means for connecting together said first conductors of the tire pair for providing a conducting path between the rails of said track through the medium of said secondary conductors for shunting the track.

2. In combination with a rail vehicle and a stretch of railway track; a pair of resilient tires for a wheel pair mounted upon an axle of said vehicle for rotation therewith, said tires having a tread constructed of flexible conducting material; two slip rings, one for each of said two wheels, connected together electrically and fastened to the body of said vehicle; and means for constantly connecting each of said conducting treads with its associated slip ring to establish a shunt path between the rails of said track.

HAROLD S. LOOMIS.